(12) United States Patent
Nishinosono et al.

(10) Patent No.: US 6,220,275 B1
(45) Date of Patent: Apr. 24, 2001

(54) SOLENOID VALVE

(75) Inventors: Hiroyuki Nishinosono; Norio Uemura; Nobuyuki Oka, all of Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/317,605

(22) Filed: May 25, 1999

(30) Foreign Application Priority Data

May 25, 1998 (JP) ................................................. 10-159928

(51) Int. Cl.[7] .................................................. F16K 31/02
(52) U.S. Cl. ............... 137/238; 251/129.05; 251/129.08; 251/129.21
(58) Field of Search ..................... 137/237, 238; 251/129.08, 129.15, 129.21, 129.22, 129.05, 205

(56) References Cited

U.S. PATENT DOCUMENTS

| 3,185,177 | * | 5/1965 | Brandenberg et al. | 251/129.21 |
| 3,324,889 | * | 6/1967 | Batts | 251/129.21 |
| 3,550,632 | * | 12/1970 | Noakes | 251/129.21 |
| 4,639,704 | * | 1/1987 | Shand et al. | 335/255 |
| 4,711,265 | * | 12/1987 | Davis et al. | 137/454.2 |
| 4,790,351 | * | 12/1988 | Kervagoret | 137/596.17 |
| 5,358,215 | * | 10/1994 | Buth et al. | 251/129.21 |
| 5,897,098 | * | 4/1999 | Nishinosono et al. | 251/129.08 |

FOREIGN PATENT DOCUMENTS

| 8-178108 | 7/1996 | (JP) . |
| 9-14482 | 1/1997 | (JP) . |

* cited by examiner

Primary Examiner—George L. Walton
(74) Attorney, Agent, or Firm—Jacobson, Price, Holman & Stern, PLLC

(57) ABSTRACT

The solenoid valve (10) has an armature chamber (38) communicated with the outlets (86) of the valve to receive feed of fluid. The fluid in the chamber (38) is drained through drain passages (96) which are arranged to open into the chamber (38) at a location radially outwardly offset from the axis of the valve. The flow of fluid flowing into the chamber (38) is directly transferred to the drain passages (96) to thereby wash ferrous particles away from the magnetic gap to self-clean the gap each time the valve is opened. A spacer (62) made of a non-magnetizable material covers the upper end face of the armature (36) to prevent accumulation of ferrous particles.

15 Claims, 6 Drawing Sheets ic solenoid valve, and

SOLENOID VALVE

BACKGROUND OF THE INVENTION

1. Field of the Invention

The present invention relates to a solenoid-operated flow control valve which is particularly suitable for use in a hydraulic system wherein a working fluid contaminated by and laden with minute particles of metallic materials is circulated.

2. Description of the Prior Art

Solenoid valves are widely used in various hydraulic systems to electronically control flow of a fluid.

As shown in FIG. 1A, a solenoid valve may typically include a movable valve member 1 connected to an armature or plunger 2. The armature 2 is operated by a solenoid assembly comprised of a solenoid windings 3, a magnetic pole piece 4, and a yoke member 5. The armature is biased downwards by a return coil spring 6 which is supported at its upper end by a spring retainer 7 which may be in the form of an adjusting screw adjustably screwed into the pole piece 4. An annular spacer 8 made of a non-magnetizable material is fixed to the lower end of the pole piece 4 so as to limit the upward travel of the armature 2 to thereby space the armature at a given distance from the pole piece in the fully open position of the valve.

In the case where the solenoid valve is controlled by an electronic control system, it is customary to operate the solenoid valve on the duty cycle basis by cyclically energizing the solenoid windings with intermittent drive pulses having a frequency which may range, for example, from 200 to 300 cycles per second, the degree of opening of the valve being controlled by varying the width, or duty factor, of respective drive pulses.

Such an intermittent energization of the solenoid coil would result undesirable chattering of the valve. In order to suppress or subdue chattering of the valve that would result from the duty cycle operation of the solenoid, the armature chamber 9 receiving the armature 2 is filled with a fluid to thereby damp the vibratory movement of the armature 2. To this end, the armature chamber 9 is communicated by an annular passage 10 with the outlet port 11 of the valve to admit the fluid at the outlet to flow into the armature chamber, the passage 10 being formed between the armature and the yoke member 5. The fluid in the armature chamber is drained by a drain passage 12 which extends axially throughout the spring retainer 7.

In certain applications of the solenoid valves, a hydraulic fluid is inevitably contaminated by fine particles of ferrous materials resulting from wear of machine parts. For example, in an automatic transmission system of a vehicle, an automatic transmission fluid is circulated through various metallic moving parts such as gear trains and clutch discs so that the fluid will become considerably contaminated by finely divided debris, fragments or particles of ferrous materials resulting from wearing of gears and other metallic parts.

The problem encountered with the solenoid valves as used to control a ferrous contaminant-laden fluid is that ferrous particles born in the hydraulic fluid are magnetically attracted and trapped in the magnetic gaps of the solenoid structure as the fluid is passed through the armature chamber.

More specifically, as shown in FIG. 1B wherein parts and members encircled by a circle in FIG. 1A are shown in an enlarged scale, ferrous particles are attracted to and deposit on the lower end face of the pole piece 4 as well as on the upper end face of the armature 2 as schematically shown at 12 and 13. Metallic particles are also magnetically held at the radial gap between the armature and the yoke member as shown at 14. Furthermore, particles are accumulated between the consecutive turns of the coil spring as shown at 15.

The ferrous particles magnetically accumulated in this manner at the magnetic gaps of the solenoid will be oriented along the magnetic flux path in an acicular fashion to project from one surface toward the opposite surface of the magnetic gap, thereby giving rise to a situation in which the gap is somewhat bridged or short-circuited by chains of attracted particles. As a result, the magnetic permeability across the gap is inadvertently increased in response to a lapse of time so that the operating property of the solenoid valve, e.g., the current versus fluid pressure characteristics, is undesirably altered during the service life of the solenoid valve.

Accordingly, it is an object of the present invention to provide a solenoid valve which is suitable for use in controlling a fluid which is contaminated by and laden with minute particles of metallic materials.

Another object of the invention is to provide a solenoid valve which is capable of effectively preventing ferrous particles from accumulating at the magnetic gaps of the solenoid assembly.

A still another object of the invention is to provide a solenoid valve which exhibits a constant operating characteristics throughout the service life of the valve.

SUMMARY OF THE INVENTION

This invention provides a solenoid valve having a movable valve member operated by a solenoid actuator having an armature movably received in an armature chamber communicated by an annular passage with an outlet of the valve, a drain passage extending from the chamber to communicate the chamber with the outside of the valve.

The feature of the invention is that the drain passage is arranged to open into the armature chamber at a location radially outwardly offset from the axis of the chamber.

With this arrangement, a flow of fluid flowing from the annular passage into the armature chamber is directly transferred and delivered toward the drain passage without passing the central region of the chamber in which the fluid tends to stay stagnant. As a result, the flow of fluid that has entered into the armature chamber will continue to flow into the drain passage without loosing its velocity to any substantial degree. Accordingly, sludge of ferrous particles magnetically attracted at the magnetic gaps of the solenoid assembly is washed away by the flow of fluid so that the gaps are self-cleaned each time the solenoid valve is actuated.

Another advantage is that the flow of fluid entered into the armature chamber is allowed to leave the armature chamber without being brought into contact with the return coil spring which is arranged at the center of the chamber. This prevents the ferrous particles in the fluid from being attracted and adhering to the coil spring.

Preferably, the drain passage is formed between a magnetic pole piece of the solenoid structure and a spring retainer received in the central bore of the pole piece.

In a preferred embodiment of the invention, the solenoid assembly includes an annular spacer, of a non-magnetizable material, arranged between the armature and the magnetic pole piece. The spacer is mounted to the armature and covers an end face of the armature. With this arrangement, ferrous particles in the fluid is prevented from accessing the end face of the armature.

In an alternative embodiment, the spacer is fixed to the magnetic pole piece and is configured to cover an end face of the pole piece facing the armature in such a manner as to prevent ferrous particles from accessing the end face of the pole piece.

In another embodiment of the invention, the outer surface of the armature exposed in the armature chamber is coated with a coating of a non-magnetizable material, such as a fluorocarbon resin. The resin coating on the armature assists the ferrous particles magnetically held at the radial gap between the armature and the yoke member to be readily released and washed away from the opposite surfaces of the gap.

These features and advantages of the invention, as well as other features and advantages thereof, will become apparent from the following description.

DESCRIPTION OF THE PREFERRED EMBODIMENTS

Figure 1A:
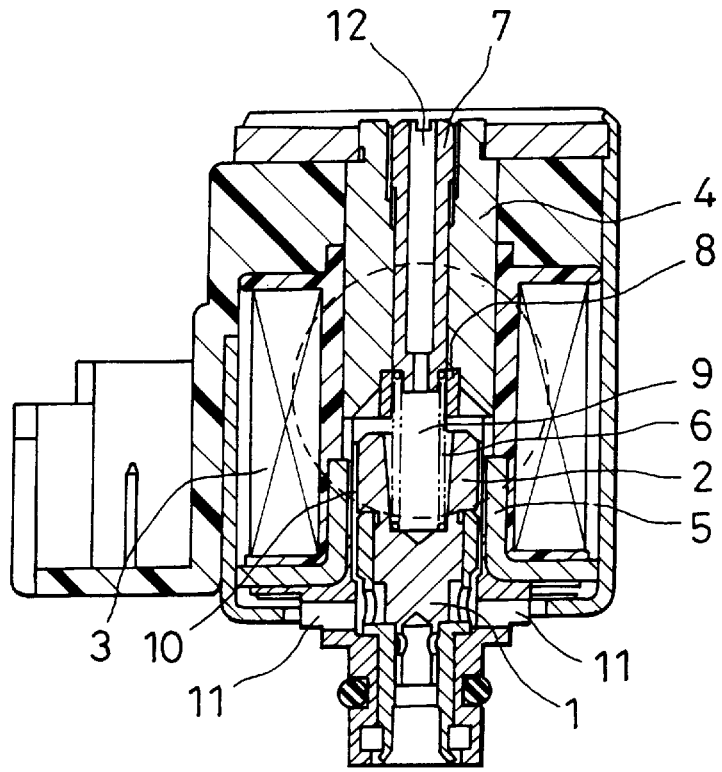
FIG. 1A is a cross-sectional view of the solenoid valve of the conventional design.
Figure 1B:
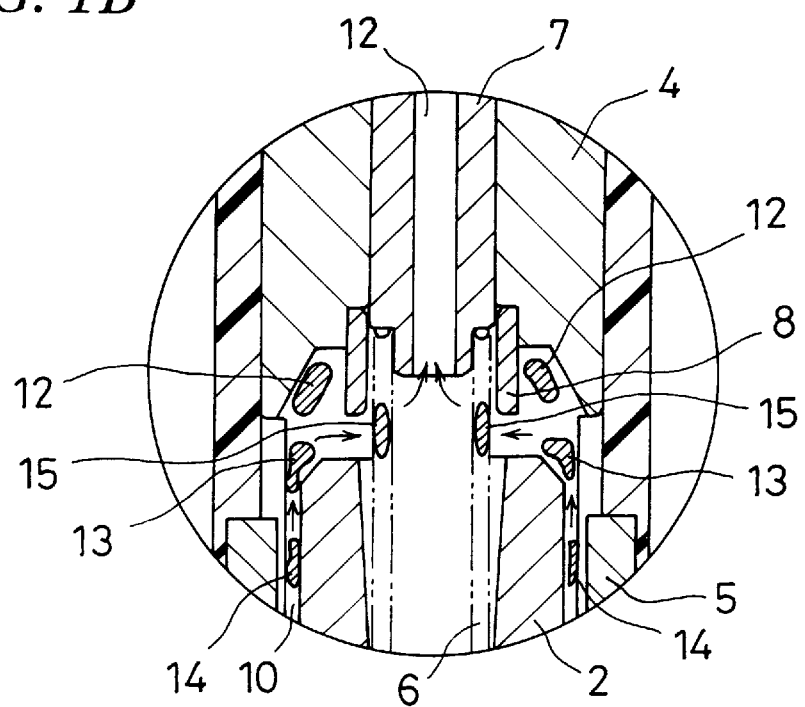
FIG. 1B is an enlarged cross-sectional view showing the part encircled by the dotted circle in FIG. 1A.
Figure 2:
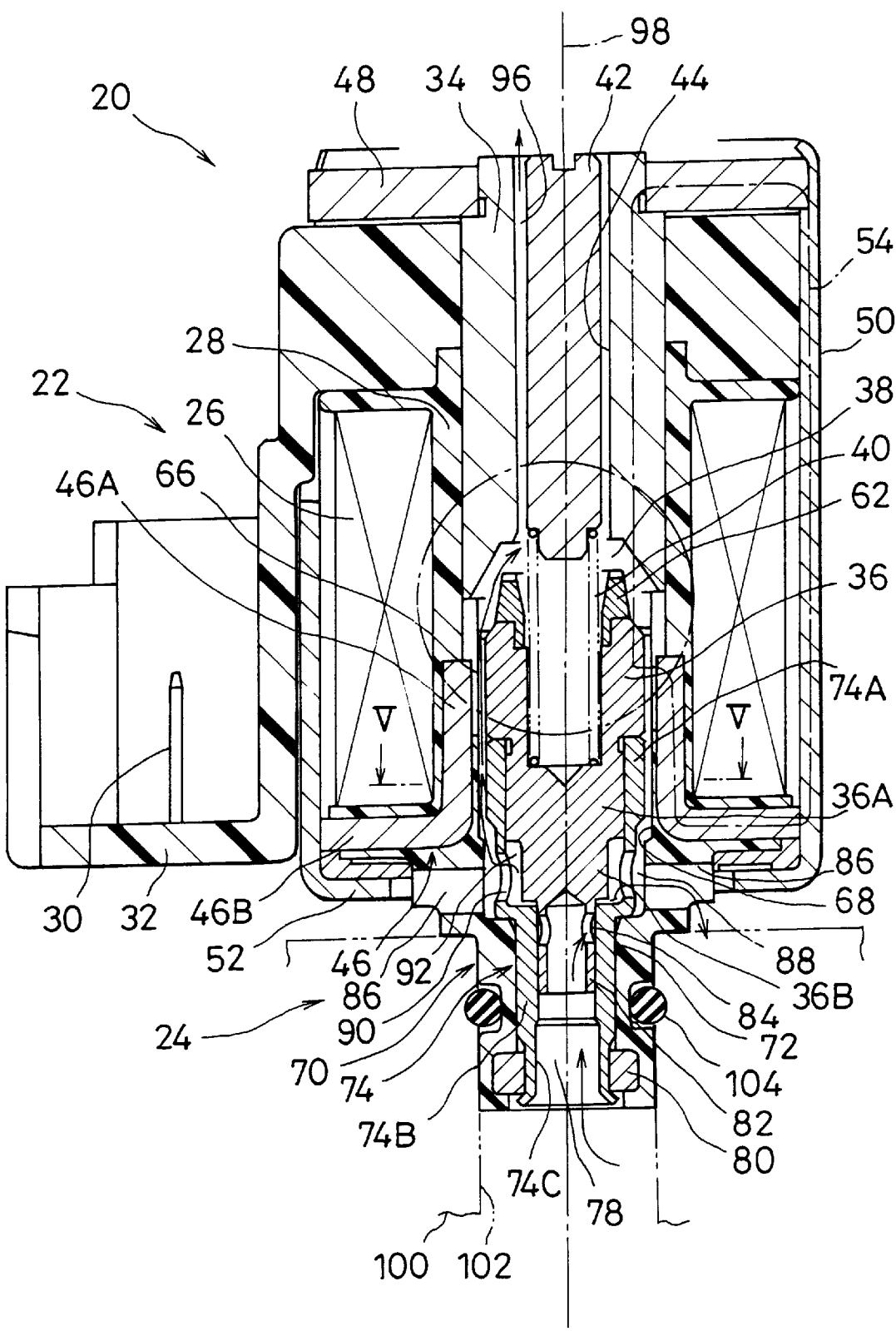
FIG. 2 is a cross-sectional view of the solenoid valve according to the first embodiment of the invention.

Referring to FIGS. 2–6, the solenoid valve according to the first embodiment of the invention will be described. As shown in FIG. 2, the solenoid valve 20 includes an upper solenoid section 22 and a lower valve section 24 coupled together to form a unitary structure.

The solenoid section 22 includes a solenoid windings 26 wound around a flanged tubular solenoid bobbin 28 made by injection molding of a plastic material. The solenoid windings 26 are connected by lead wires, not shown, to connecting pins 30 of an electric socket 32.

The solenoid section 22 also includes a generally cylindrical magnetic pole piece 34 made of a ferromagnetic material and tightly fitted within the upper part of the central bore of the bobbin 28.

The solenoid section 22 further includes a movable armature or plunger 36 which is movably received in an armature chamber 38 defined by the stepped lower part 68 of the central bore of the bobbin 28. The armature 36 is downwardly biased by a return coil spring 40 having its lower end abutting against the bottom of a cylindrical recess formed in the armature 36. The upper end of the spring 40 is adjustably supported by a spring retainer 42 which is in the form of an adjusting screw threadingly engaged in a threaded central bore 44 axially extending through the pole piece 34.

The solenoid section 22 also has an annular lower yoke member 46 made of a ferromagnetic material. The yoke member 46 is insert molded in the bobbin 28 and has an axially extending tubular portion 46A and a radially extending flange portion 46B. A disc-shaped top plate or upper yoke member 48 made of a ferromagnetic material and having a central opening is mounted on an annular shoulder formed at the upper part of the pole piece 34.

The central pole piece 34, yoke member 46, solenoid windings 26 and top plate 48 are surrounded by a tubular outer casing 50 made of a ferromagnetic material and having an inturned lower flange 52. The top plate 48 is firmly held against the pole piece 34 by inwardly crimping the upper end of the outer casing 50.

When the solenoid windings 26 is energized, a path of magnetic flux will be formed as shown by the dotted line 54 across the pole piece 34, armature 36, yoke member 46, outer casing 50 and top plate 48, to thereby attract the armature 36 toward the pole piece 34 against the bias of the return spring 40.

Figure 3:
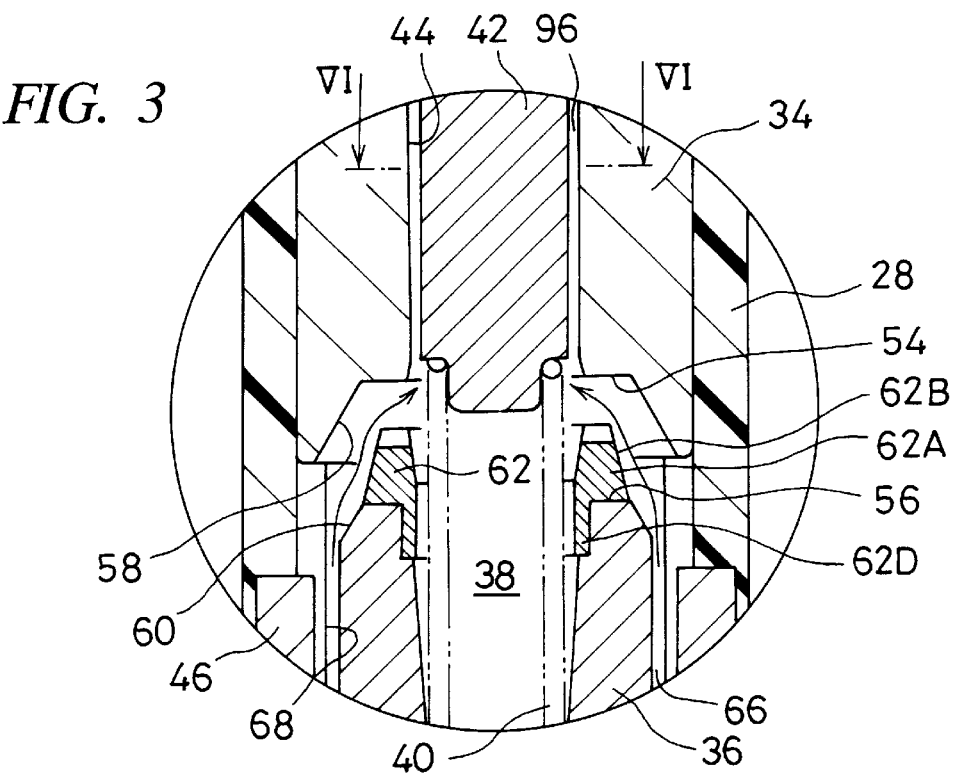
FIG. 3 is an enlarged cross-sectional view showing the part encircled by the dotted circle in FIG. 2.

To ensure that the magnetic attractive force acting on the armature 36 is as proportional as possible to the intensity of the electric current supplied to the solenoid windings, part of the lower end face 54 of the pole piece 34 and the upper end face 56 of the armature 36 are conically tapered upwardly as shown at 58 and 60, respectively, as will be best understood from FIG. 3.

An annular spacer 62 made of a non-magnetizable material such as stainless steel, copper, brass or plastics is mounted at the top of the armature 36 to limit the upward stroke of the armature 36. When the armature 36 has fully stroked, the spacer 62 will abut against the lower end face 54 of the pole piece 34 so that the armature 36 is axially spaced away from the pole piece 34 for a given minimum distance to thereby leave an axial magnetic gap of a minimum value between the armature 36 and the pole piece 34. The presence of the minimum axial magnetic gap is also favorable to ensure that the magnetic attractive force acting on the armature 36 is as proportional as possible to the intensity of the electric current supplied to the solenoid windings.

Figure 4:
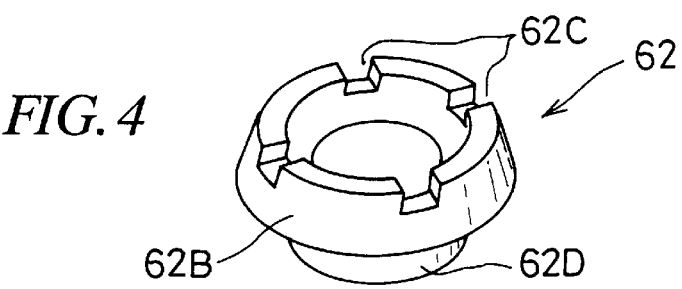
FIG. 4 is a perspective view of the spacer shown in FIGS. 2 and 3.

The spacer 62 has an upper portion 62A having a conically tapered side wall 62B which is generally in flush with the tapered end face portion 60 of the armature 36. As shown in FIG. 4, the upper end of the spacer 62 is provided with a plurality of cutouts 62C for reasons described later. The spacer 62 is provided at the lower part thereof with a reduced-diameter tubular portion 62D which is press fitted within a stepped central bore of the armature 36.

As best shown in FIG. 3, a small annular clearance 66 is held between the stepped central bore 68 of the bobbin 28 and the outer surface of the armature 36. This clearance 66 functions as a radial gap between the armature 36 and the yoke member 46. The annular clearance 66 also serves as a fluid passage as described later.

Referring again to FIG. 2, the valve section 24 has a generally tubular body 70 of plastics which is molded integrally with the solenoid bobbin 28. The body 70 has an axial bore 72 in which a tubular valve seat insert 74 made of a non-magnetizable metallic material such as stainless steel is interference fitted.

The valve seat insert 74 comprises a large diameter upper part 74A serving as a guide sleeve for the armature 36 and a small diameter lower part 74B serving as a valve seat. The guide sleeve 74A slidably and guidingly receives the lower part 36A of the armature 36. As will be understood from FIG. 5, the guide sleeve 74A is closely fitted within the bobbin 28 and, therefore, is firmly supported by the latter in the radial direction. The valve seat insert 74 has an annular shoulder which abuts against an associated annular shoulder formed in the body 70 at the bottom of the armature chamber 36. The valve seat insert 74 is held in place by crimping the lower end thereof outwardly against a metal ring 80 insert molded within the body 70.

Figure 5:
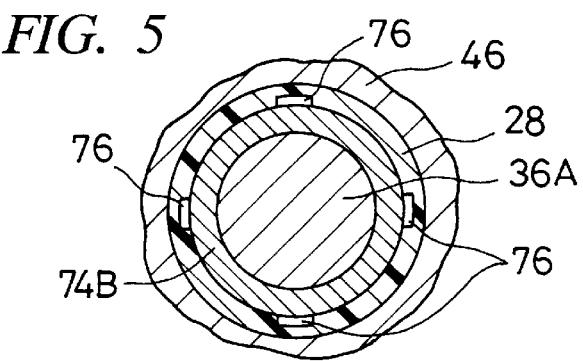
FIG. 5 is a cross-sectional view taken along the line V—V of FIG. 2.

The inner periphery of the guide sleeve 74A and the outer periphery of the lower part 36A of the armature mating with each other are precision machined to axially precisely guide the armature 36. As shown in FIG. 5, a plurality of axially extending grooves 76 are formed on the inner periphery of the bobbin 28 to communicate with the annular passage 66.

Referring further to FIG. 2, the valve seat 74B has an axial bore 74C forming an inlet 78 for the valve section 24. The upper part of the bore 74C is precision machined and slidably and snugly receives a movable valve member 82 which, in the illustrated embodiment, is made integral with the armature 36.

The valve member 82 is tubular in form and is provided with a pair of diametrically opposed control ports 84 which are closed and opened by the valve seat 74B as the valve member 82 is axially displaced in response to the movement of the armature 36. The control ports 84 are located such that, in the fully closed position of the valve, the outer surface of the valve member 82 and the inner wall of the valve seat 74B is preferably overlapped for a predetermined axial length in order to minimize any fluid leakage.

The body 70 is provided with a plurality of radially extending outlets 86 which are open into an annular space 88 formed at the lower part of the armature chamber 36 between the body 70 and the guide sleeve 74A. The guide sleeve 74A is, in turn, provided with a plurality of openings 90 which communicate the annular space 88 with an annular space 92 defined between the guide sleeve 74A and the lowermost part 36B of the armature 36.

Figure 6:
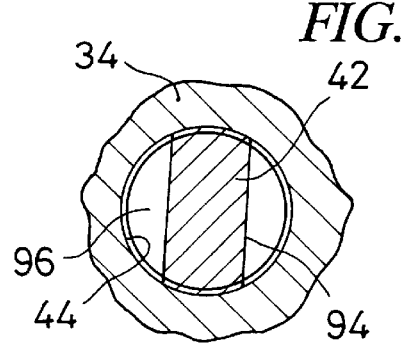
FIG. 6 is a cross-sectional view taken along the line VI—VI of FIG. 3.

Referring to FIGS. 2 and 6, the opposite sides of the spring retainer 42 which is in the form of an adjusting screw are chamfered along the entire length thereof to present flat side faces 94. As a result of chamfering, a pair of diametrically opposed axial passages 96 of a lunate cross-section are formed between the threaded central bore 44 of the pole piece 34 and the spring retainer 42. The passages 96 serve as the drain passages for the armature chamber 38. It will be noted that the lower end of each drain passage 96 opens into the armature chamber 38 at a location which is radially outwardly offset from the central axis 98 of the solenoid valve.

In use, the solenoid valve 10 may be installed on a hydraulic system 100 by fluid tightly fitting the body 70 into a conduit 102 of the system, with an O-ring 104 being fitted in an annular groove of the body 70. The solenoid valve 10 may be operated on the duty cycle basis by an electric control unit in the conventional manner.

Upon application of an electric current to the solenoid coil 26, the armature 36 will be magnetically attracted toward the pole piece 34 causing the valve member 82 to move on its valve opening upward stroke to thereby open the control ports 84. The travel of the valve member 82 and, hence, the opening of the control ports 84 is controlled by varying the duty factor of the drive pulses.

As the control ports 84 are opened, the fluid at the inlet 78 is allowed to pass through the annular space 92 defined between the guide sleeve 74A and the lowermost part 36B of the armature 36, the openings 90 in the guide sleeve 74A, and the annular space 88 between the body 70 and the guide sleeve 74A to flow toward the outlets 86.

The fluid pressure at the annular space 88 will force a small amount of fluid to flow through the axial grooves 76 and the annular passage 66 into the top of the armature chamber 38. The flow of fluid entered into the top of the chamber 38 will be guided and directed by the tapered side wall 62B of the spacer 62 to smoothly flow into the radially outwardly-offset drain passage 96, without passing the central region of the armature chamber 38. Accordingly, the fluid will flow along the tapered end faces 58 and 60 of the pole piece 34 and the armature 36 while substantially keeping its velocity. As a result, sludge of ferrous particles that may be magnetically attracted at the magnetic gap between the pole piece 34 and the armature 36 will be washed away so that the gap will be self-cleaned each time the solenoid valve is opened.

Furthermore, as the fluid flow entered into the armature chamber 38 is drained therefrom without being brought into contact with the return coil spring 40, the risk of ferrous particles to adhere to and accumulate on the coil spring 40 is considerably reduced.

The upper end face of the armature 36 is free from deposit of ferrous particles as it is covered by the spacer 62 made of a non-magnetizable material. The cutouts 62C formed in the spacer 62 ensure a fluid flow even when armature has fully stroked to bring the spacer 62 into abutment with the pole piece 34.

Figure 7:
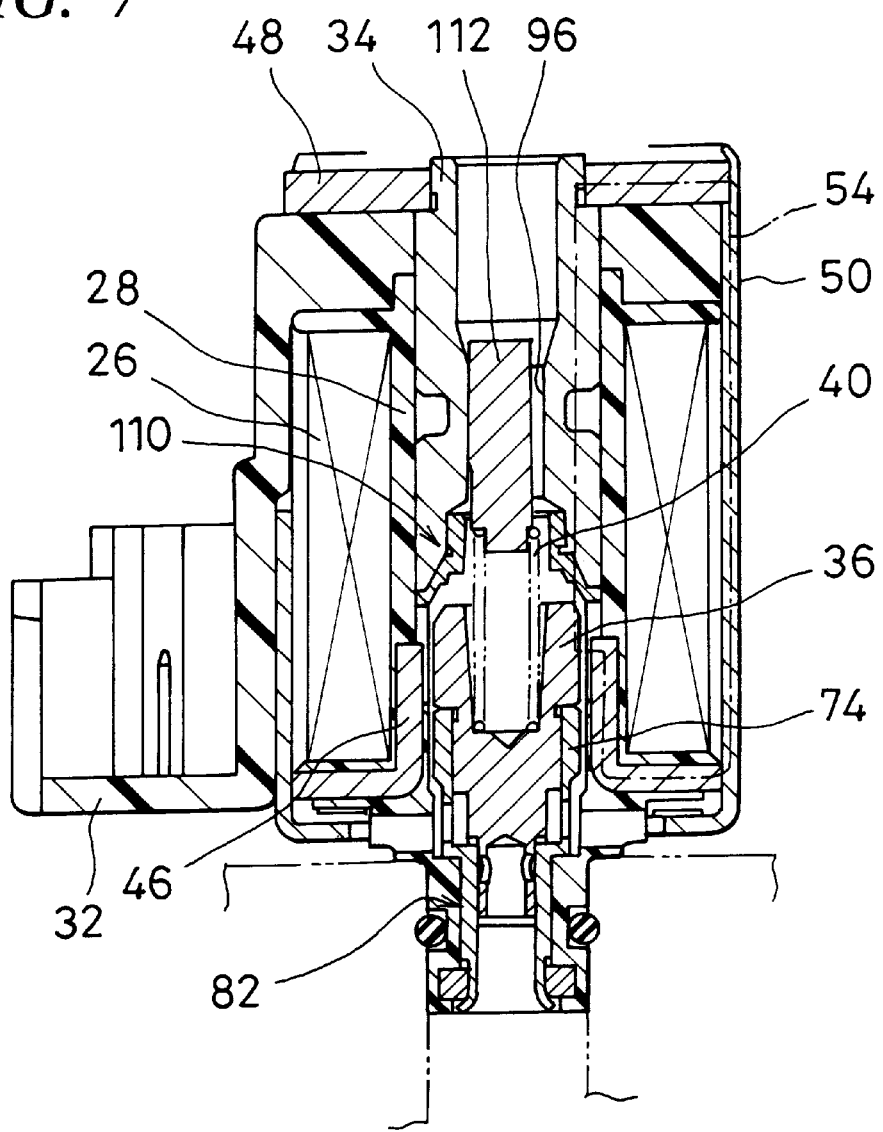
FIG. 7 is a cross-sectional view of the solenoid valve according to the second embodiment of the invention.
Figure 8:
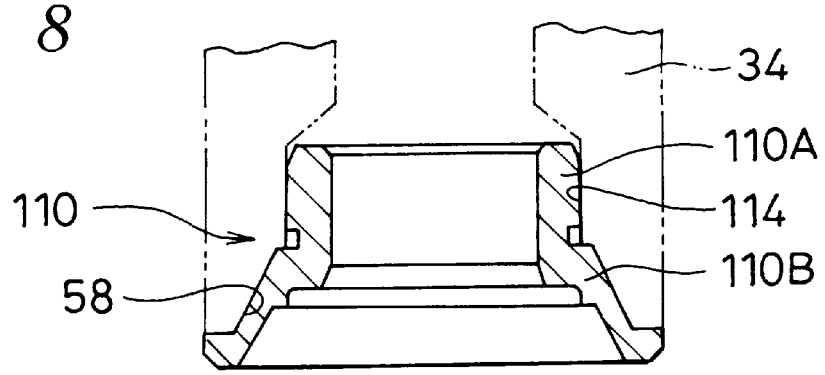
FIG. 8 is a cross-sectional view in an enlarged scale of the spacer shown in FIG. 7.

FIGS. 7 and 8 illustrate the solenoid valve according to the second embodiment of the invention. Parts and members similar to those of the first embodiment are shown by like reference numerals and, therefore, need not be described again.

Referring to FIGS. 7 and 8, the second embodiment differs from the first embodiment in that the annular spacer 110, made of a non-magnetizable material, is fixed to the magnetic pole piece 34 in such a manner as to cover substantially the entire lower end face thereof and that the spring retainer 112 which is in the form of a rod is press fitted within the unthreaded central bore of the pole piece 34.

As shown enlarged in FIG. 8, the spacer 110 has an upper tubular mounting portion 110A press-fitted within an axial bore 114 of the pole piece 34 and a lower skirt portion 110B closely mating with the tapered end face 58 of the pole piece 34. As in this embodiment substantially the entire lower end face of the magnetic pole piece 34 is covered by the non-magnetizable spacer 110 and is, therefore, intercepted from the fluid in the armature chamber 38, there is no risk of ferrous particles being attracted to the end face of the pole piece 34.

Similar to the first embodiment, the lateral sides of the spring retainer 112 are chamfered to form the drain passages 96, only one of which is shown in FIG. 7.

Figure 9:
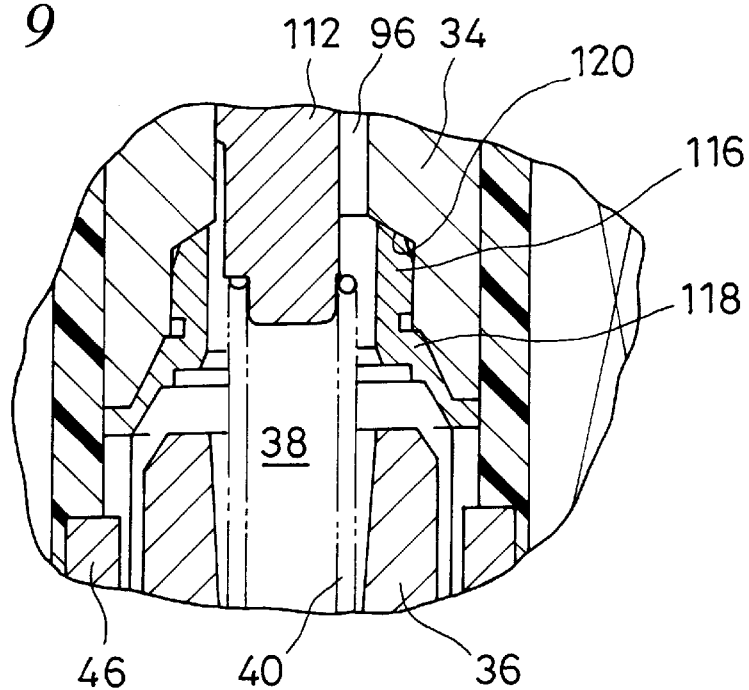
FIGS. 9 and 10 show the modified forms of the spacer.
Figure 10:
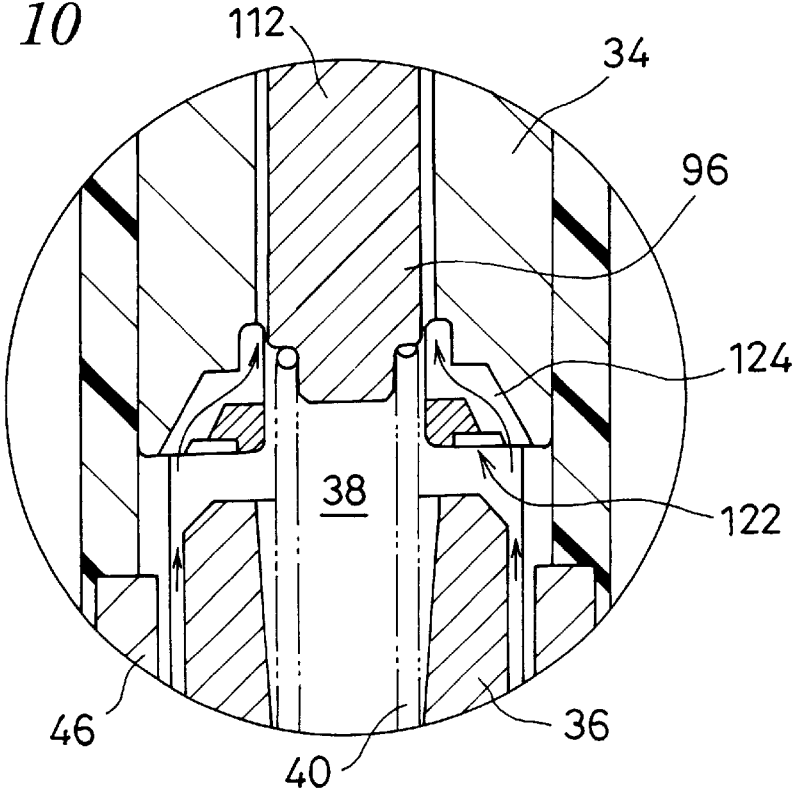

FIGS. 9 and 10 show the modified embodiments of the spacer 110 shown in FIGS. 7 and 8. In the embodiment shown in FIG. 9, the spacer 116 with a similarly tapered skirt portion 118 is designed to closely fit with the uppermost tapered end face portion 120 of the pole piece 34. In another modified version shown in FIG. 10, the spacer 122 of non-magnetizable material which is similarly shaped to cover the entire end face of the pole piece is affixed to the pole piece 34. The spacer 122 is provided with a plurality of grooves 124 circumferentially spaced apart from one another. As shown, each groove 124 extends along the juncture between the pole piece and the spacer to ensure that the fluid issuing from the radial gap between the yoke member 46 and the armature 36 is directly transferred toward the drain passages 96 as shown by the arrows.

Figure 11:
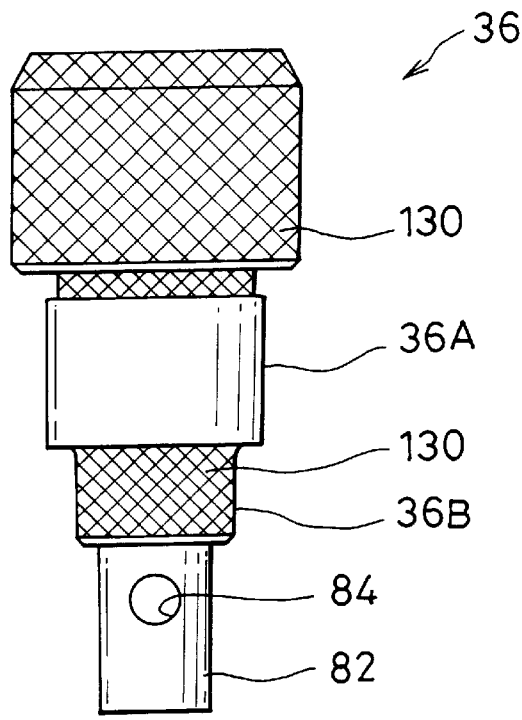
FIGS. 11 and 12 show the modified versions of the armature and valve assembly.
Figure 12:
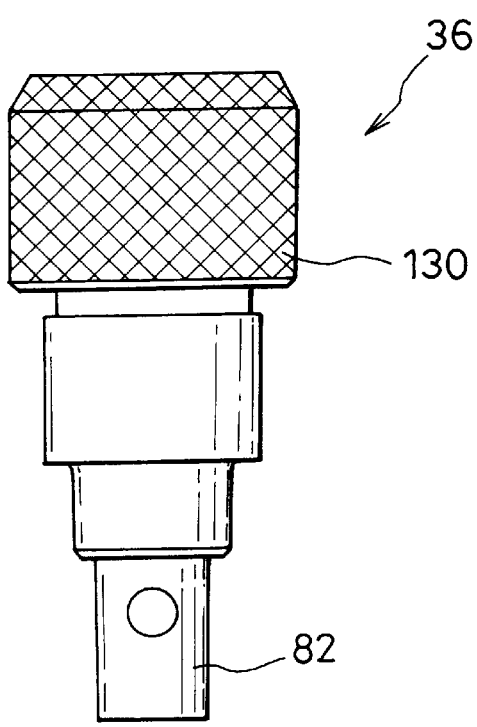

FIG. 11 illustrates a modified form of the armature incorporated in the foregoing embodiments. In this embodiment, the outer surface of the armature 36 at the uppermost part and the lowermost part 36B thereof is coated with a coating 130 of fluorocarbon resin such as polytetrafluoroethylene. The thickness of the coating 130 is preferably 10–20 micrometers. The mid part 36A of the armature which is slidingly guided by the guide sleeve 74A is uncoated and precision machined so as to guide the armature with a high degree of accuracy. The coating 130 of polytetrafluoroethylene may be provided at the uppermost part of the armature 36 as shown in FIG. 12.

The coating 130 prevents ferrous particles from being magnetically attracted to the outer surfaces of the armature facing the radial and axial magnetic gaps wherein the magnetic flux is highly concentrated and assists the ferrous particles magnetically held at these gaps to be readily washed away in response to the fluid flow.

While the present invention has been described herein with reference to the specific embodiments thereof, it is contemplated that the present invention is not limited thereby and various changes and modifications may be made therein for those skilled in the art without departing from the scope of the invention.

What we claim is:

1. In a solenoid valve having a movable valve member operated by a solenoid actuator having an armature movably received in an armature chamber and a magnetic pole piece positioned therein, said chamber being communicated by an annular passage surrounding said armature with an outlet of the valve to admit a fluid at said outlet to flow into said chamber, a drain passage extending from said chamber to communicate the chamber with the outside valve, the improvement wherein at least a portion of said solenoid actuator includes non-magnetizable means for preventing ferrous particles from accessing said armature, and said drain passage is arranged to open into said armature chamber at a location radially outwardly offset from the axis of the chamber so that a flow of fluid with ferrous material having a velocity and flowing from said annular passage into said chamber is directed along an outer region of the chamber toward said drain passage without passing the central region of the chamber and without substantially loosing the velocity thereof whereby a magnetic gap of the solenoid actuator is self-cleaned each time the solenoid valve is opened.

2. A solenoid valve as defined in claim 1, wherein said solenoid actuator includes said magnetic pole piece having an axially extending bore in which is mounted a spring retainer receiving an end of a return spring engaged at the other end with said armature, and wherein said drain passage is formed between said magnetic pole piece and said spring retainer.

3. A solenoid valve as defined in claim 2, wherein said drain passage is formed by chamfering the opposite sides of said spring retainer along the length thereof.

4. A solenoid valve as defined in claim 2, wherein said non-magnetizable means includes an annular spacer, of a non-magnetizable material, arranged between said armature and said magnetic pole piece to limit the minimum distance therebetween.

5. A solenoid valve as defined in claim 4, wherein said spacer is mounted to said armature and covers at least in part an end face of the armature to prevent ferrous particles in said fluid from accessing said end face of the armature.

6. A solenoid valve as defined in claim 5, wherein a radially outer surface of the spacer is tapered in such a manner as to direct the flow of fluid issuing from said annular passage toward said drain passage.

7. A solenoid valve as defined in claim 6, wherein said spacer is provided at an end thereof facing said pole piece with a cutout to permit fluid to flow when said spacer is brought into contact with said pole piece.

8. A solenoid valve as defined in claim 4, wherein said spacer is fixed to the pole piece, said spacer being configured to cover an end face of the pole piece facing said armature to thereby prevent ferrous particles in said fluid from accessing said end face of the pole piece.

9. A solenoid valve as defined in claim 8, wherein said spacer covers substantially the entire end face of the pole piece.

10. A solenoid valve as defined in claim 9, wherein said spacer is provided with a groove which communicate said chamber with said drain passage.

11. A solenoid valve as defined in claim 1, wherein said non-magnetizable means includes an outer surface of said armature exposed in said chamber and is coated with a coating of a non-magnetizable material.

12. A solenoid valve as defined in claim 11, wherein said coating is made of a fluorocarbon resin.

13. A solenoid valve as defined in claim 11, wherein said armature is slidably guided within a metallic guide sleeve and wherein the outer surface of the armature slidingly guided by said sleeve is uncoated and precision machined.

14. A solenoid valve as defined in claim 13, wherein a radial clearance between said sleeve and said armature is less than 20 micrometers to prevent ingress of metallic particles.

15. A solenoid valve comprising:

a body defining an axially extending armature chamber having a central region and a fluid passage having an inlet and an outlet;

a valve seat formed across said fluid passage;

a movable valve member cooperating with said valve seat to control flow of fluid through said passage;

a movable armature received in said chamber and operatively connected to said valve member;

a solenoid unit having a magnetic pole piece coaxial with said armature, said pole piece having an axial bore extending therethrough;

a spring retainer fitted in said bore of the pole piece;

a return coil spring supported at an end by said spring retainer and engaged at the other end with said armature for biasing the armature toward a valve closing position;

an annular spacer, of a non-magnetizable material, disposed between said armature and said pole piece to limit the travel of said armature and prevent ferrous particles from accessing at least one of said armature and said pole piece;

an annular passage communicating said outlet with said chamber to permit the fluid at said outlet to flow into said chamber; and, a drain passage formed between said pole piece and said spring retainer and opening into said armature chamber at a location radially outwardly offset from the axis of the chamber so that a flow of fluid having a velocity and flowing from said annular passage into said chamber is directed along an outer region of the chamber toward said drain passage by by-passing the central region of the chamber and without substantially loosing the velocity thereof whereby a magnetic gap between the armature and the pole piece is self-cleaned each time the solenoid valve is opened.

* * * * *